United States Patent Office 3,511,835
Patented May 12, 1970

3,511,835
CAFFEINE-, METHYL- AND PHENYLISOPROPYL-SUBSTITUTED ETHYLENEDIAMINE
Juan Miquel Quintilla, Calle Viladomat 71, Barcelona, Spain
No Drawing. Filed Apr. 15, 1968, Ser. No. 721,215
Claims priority, application Spain, Nov. 13, 1967, 347,509
Int. Cl. C07d 57/54, 57/58
U.S. Cl. 260—256    2 Claims

ABSTRACT OF THE DISCLOSURE

This invention relates to new compounds, namely 8-[2 - [N - ($\alpha$ - methylphenylethyl) - methylamino]-ethylamino]-caffeine and non-toxic acid addition salts, which compounds have pronounced analeptic, psychotonic, antidepressive and antispasmodic properties, and which compounds can be administered orally, rectally or parenterally.

BACKGROUND OF THE INVENTION

This invention relates generally to compounds in which one of the nitrogen atoms of ethylenediamine is mono substituted by a caffeine radical while the other nitrogen atoms are disubstituted by methyl and by 2-phenylisopropyl radicals, the resulting compound being an effective analeptic, psychotonic, antidepressive and antispasmodic agent. The medicinal art is constantly seeking compounds having these properties, and particularly such compounds which have a low toxicity.

SUMMARY OF THE INVENTION

This invention provides for the production of a new compound 8 - [2 - [N - ($\alpha$ - methylphenylethyl)-methylamino] - ethylamino] - caffeine and acid addition salts thereof, particularly the hydrochloride thereof, which compound and acid addition salts can be used orally, rectally or parenterally to take advantage of its antispasmodic, analeptic, psychotonic and antidepressive actions.

It is a primary object of the present invention to provide such new compound and also to provide for a method of producing the same.

Other objects and advantages of the invention will be apparent from a further reading of the specification and of the appended claims.

With the above and other objects in view, the present invention mainly comprises as a new compound having analeptic, psychotonic, antidepressive and antispasmodic properties, a compound of the formula:

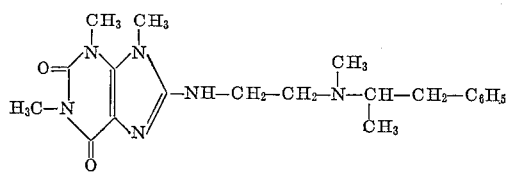

as well as non-toxic, physiologically compatible acid addition salts thereof, such as the hydrochloride.

It will be seen that the above compound is an ethylenediamine wherein one of the nitrogen atoms is mono substituted by a caffeine radical, while the other nitrogen atom is disubstituted by methyl and by 2-phenylisopropyl radicals. The empirical formula of the compound is $C_{20}H_{28}N_6O_2$.

The above compound is obtained by reacting the 8-haloxanthine with the substituted ethylenediamine. Thus, if 8 - chloro - 1,3,7 - trimethyl - 2,6 - dioxypurine is reacted with $N^1$ - methyl - $N^1$ - (2 - phenylisopropyl)-ethylenediamine, with or without the presence of an organic solvent, there is obtained a new compound as set forth above, having the important pharmacological properties indicated above.

It has been found that when a mixture of 8-chlorocaffeine and $N^1$ - methyl - $N^1$ - (2 - phenylisopropyl)-ethylenediamine, is appropriate proportions, is heated to a temperature of about 150–170° C., there is obtained a product which, after treatment with 96% alcohol, has the characteristics and properties and corresponds to the compound 8 - [2 - [N - ($\alpha$ - methylphenylethyl) - methylamino]-ethylamino]-caffeine.

The product is directly obtained in the form of the hydrochloride as a white powder which melts at 275° C. It is soluble in water and slightly soluble in methyl alcohol and ethyl alcohol. It can be purified by dissolving in a warm mixture of water and alcohol and quickly freezing the same.

The compound can be obtained as the free base by dissolving the chlorohydrate in water and alkalizing the medium. The product obtained is a solid white which melts at 145° C.

From the base it is possible to prepare the picrate which is a solid of yellow color and which melts at 227° C.

An identification reaction which is specific to xanthines and which is positive for the above compound is carried out as follows: to 100 mg. of the product is added 10 drops of hydrogen peroxide and 1 drop of concentrated hydrochloric acid, it is evaporated until dryness and a drop of concentrated ammonium hydroxide is added. A reddish purple color appears.

The primary reactant necessary to obtain the product of the present invention, besides the halogenated caffeine, is the $N^1$ - methyl - $N^1$ - (2 - phenylisopropyl)-ethylenediamine.

It has been found that for preparation of this intermediate it is useful to carry out the reaction in an organic medium of one equivalent of chloroacetonitrile on N-methyl-2-phenylisopropylamine which results in the formation of N-methyl-N-(2-phenylisopropyl)-aminoacetonitrile which is reduced by lithium aluminum hydride to obtain the corresponding substituted ethylenediamine. The substance is a colorless liquid which boils at 125–130° C. at 10 mm. Hg. of pressure.

Pharmacological tests carried out with the product of the invention establish that the product possesses analeptic, psychotonic, antidepressive and antispasmodic properties.

In the rat the compound was found to assist the reflexes and improve the conditioning threshold. It does not affect the blood pressure. The rats treated showed a greater appetite than the controls but their weight did not increase. The $LD_{50}$ upon intraperitoneal administration is 93.4 mg./kg. of body weight and upon oral administration is 512 mg./kg. of body weight, in the rat. The antispasmodic activity was demonstrated on the isolated organ (uterus of the guinea pig).

The free base or the acid addition salts thereof can be mixed with normal pharmaceutical excipients or vehicles and administered parenterally, orally or rectally. Small doses are effective.

DESCRIPTION OF PREFERRED EMBODIMENTS

The following examples are given to illustrate the production of the compounds of the invention. The scope of the invention is not, however, meant to be limited to the specific details of the examples.

EXAMPLE 1

(a) N-(2-phenylisopropyl)-N-methyl-aminoacetonitrile

There is added drop by drop to 0.26 mol of chloroacetonitrile and 0.16 mol of sodium carbonate in 200 cc. of benzene, 0.26 mol of N-methyl-2-phenylisopropylamine dissolved in 90 cc. of benzene and the reaction mixture is refluxed for 10 hours. It is filtered, concentrated and distilled. The boiling point of the product is 135–140° C. at 4 mm. Hg.

(b) N-methyl-N-(2-phenylisopropyl)-ethylenediamine 50 g. of the N-(2-phenylisopropyl)-N-methyl-aminoacetonitrile are dissolved in 75 cc. of dry ether and the entire material is slowly added to a suspension of 15 g. of aluminum hydride and lithium in 700 cc. of dry ether. The reaction mixture is heated under refluxing with agitation for 4 hours. To destroy the excess of the aluminum complex there is added 100 cc. of ether, 200 cc. of isopropanol and 100 cc. of a mixture of isopropanol-water in a ratio of 1:1. The reaction mixture is permitted to cool and the residue is filtered and washed with ether and isopropanol. The organic solvents are distilled off and the residue is distilled. The boiling point of the resulting product is 125–130° C. at 10 mm. Hg pressure.

(c) 8-[2-[N-(α-methylphenylethyl)-methylamino]-ethylamino]-caffeine hydrochloride 19.2 g. of the $N^1$-methyl-$N^1$-(2-phenylisopropyl)-ethylenediamine at 22.8 g. of 8-chlorocaffeine are slowly heated to 160–170° C. and maintained at this temperature for 20 minutes. It is then cooled to 80° C. and absolute alcohol in an amount of ten times the volume of the product is added thereto. The reaction mixture is cooled and filtered. The melting point of the compound is 275–277° C.

EXAMPLE 2

0.05 mol of 8-chlorocaffeine is mixed with 0.10 mol of N-methyl-N-(2-phenylisopropyl)-ethylenediamine in 75 cc. of absolute alcohol in a closed container and the reaction mixture is heated to 170° C. for 20 hours. It is then cooled and permitted to crystallize. The product melts at 145° C. By dissolving in absolute alcohol and passing a current of dry hydrogen chloride gas therethrough the hydrochloride is obtained and melts at 275–277° C.

The recommended average daily dose of the hydrochloride, orally or rectally, is about 0.8 mg./kg. body weight. The doctor may vary the dose according to the patient. The average daily parenteral dose is about 30 mg. for the adult patient.

While the invention has been described in particular with respect to a specific method of production of the compounds and particular uses thereof, it is to be understood that variations and modifications of the invention can be made without departing from the spirit or scope thereof.

What is claimed is:

1. A compound selected from the group consisting of 8 - [2 - [N-(α-methylphenylethyl)-methylamino]ethylamino]-caffeine of the formula:

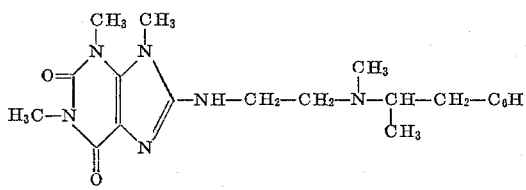

and non-toxic acid addition salts thereof.

2. Compound according to claim 1 wherein said acid addition salt is the hydrochloride.

References Cited

FOREIGN PATENTS 216,525    8/1961    Austria.
409,974    10/1966    Switzerland.

ALEX MAZEL, Primary Examiner

A. M. T. TIGHE, Assistant Examiner

U.S. Cl. X.R.

260—253; 424—253